(No Model.) 4 Sheets—Sheet 1.
L. M. NUTTING.
LATHE.
No. 324,409. Patented Aug. 18, 1885.
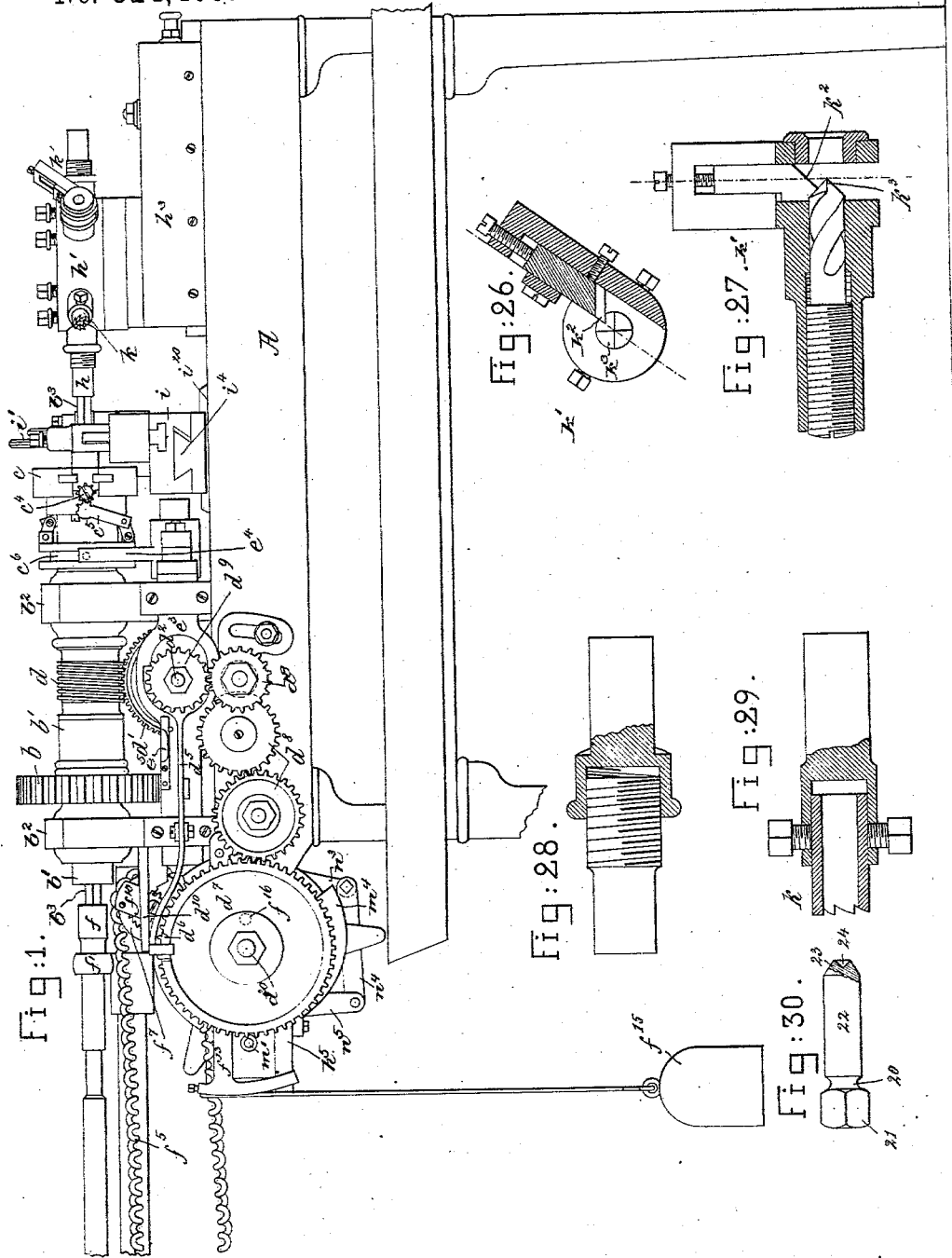
Witnesses
Arthur Tepperten.
Chas. C. Chesley
Inventor
Luther M. Nutting
by Crosby & Gregory attys

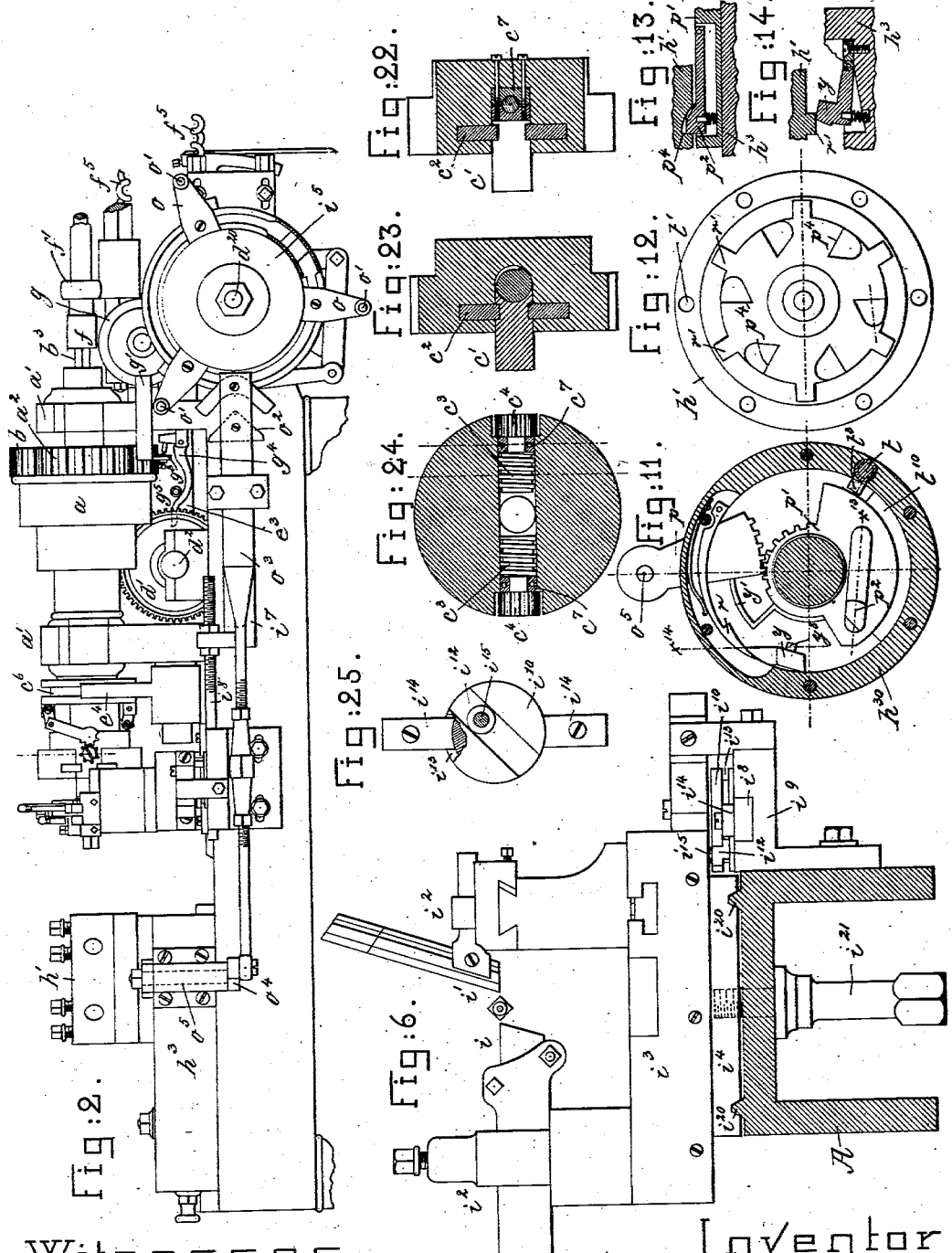

(No Model.) 4 Sheets—Sheet 3.
L. M. NUTTING.
LATHE.
No. 324,409. Patented Aug. 18, 1885.
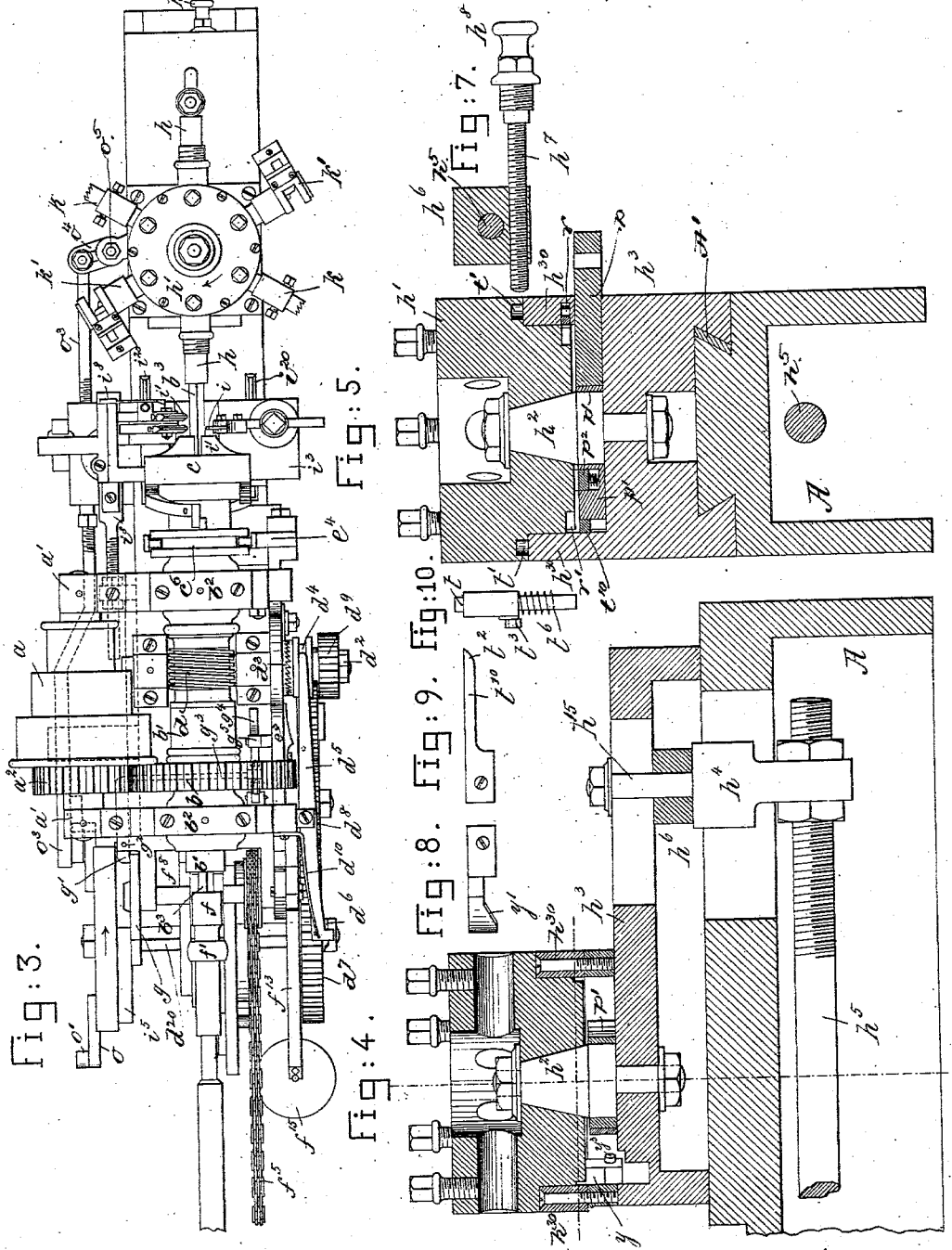
Witnesses.
Arthur Tipperton.
Chas. C. Chesley
Inventor.
Luther M. Nutting.
by Crosby & Gregory attys (No Model.) 4 Sheets—Sheet 4.
L. M. NUTTING.
LATHE.
No. 324,409. Patented Aug. 18, 1885.
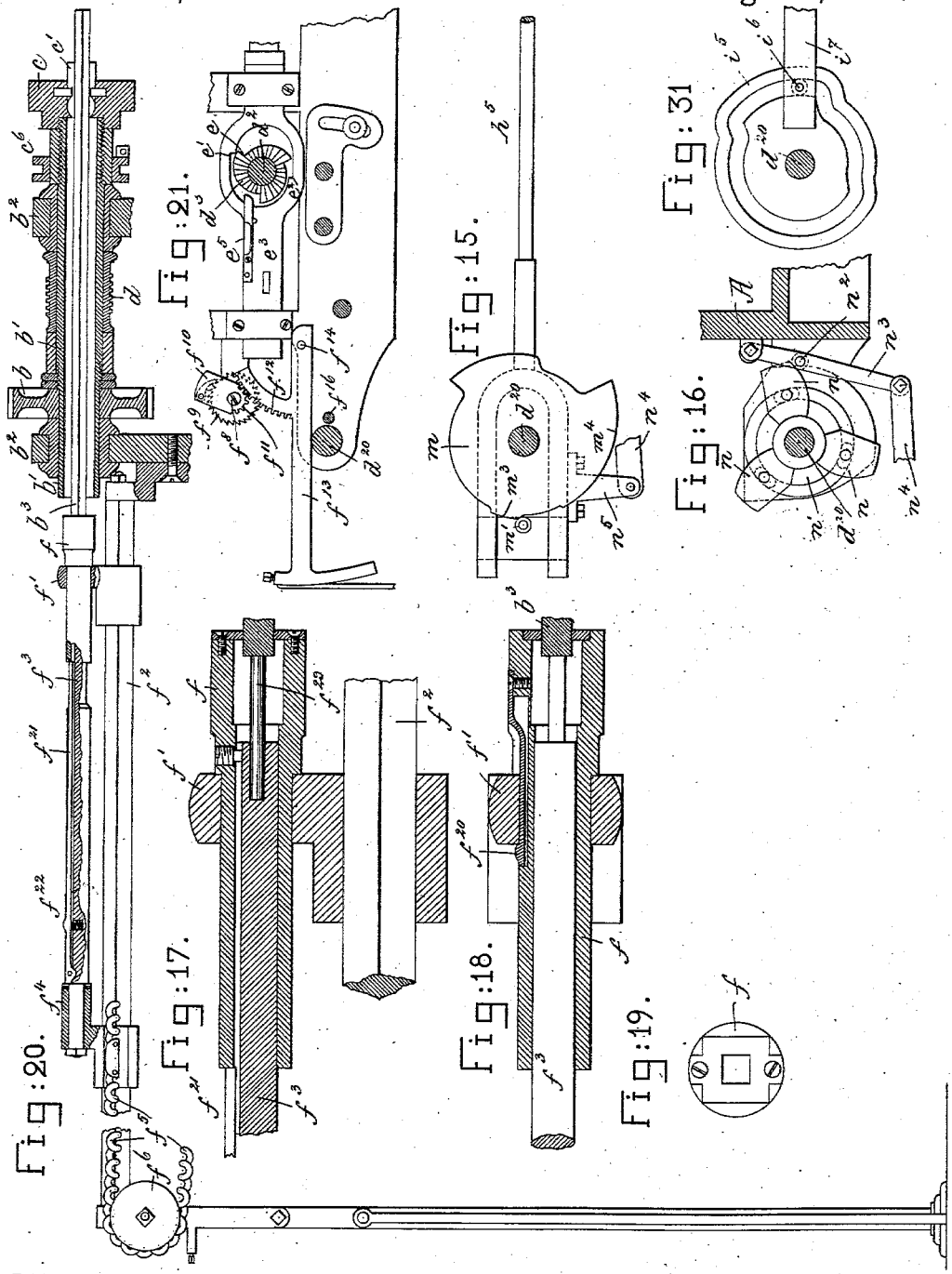
Witnesses.
Arthur Lippitlen.
Chas. C. Chesley
Inventor.
Luther M. Nutting
By Crosby & Gregory attys.

UNITED STATES PATENT OFFICE.

LUTHER M. NUTTING, OF CONCORD, NEW HAMPSHIRE.

LATHE.

SPECIFICATION forming part of Letters Patent No. 324,409, dated August 18, 1885.

Application filed May 20, 1885. (No model.)

*To all whom it may concern:*

Be it known that I, LUTHER M. NUTTING, of Concord, county of Merrimac, State of New Hampshire, have invented an Improvement in Lathes, of which the following description, in connection with the accompanying drawings, is a specification, like letters on the drawings representing like parts.

My invention relates to a turret-lathe especially intended for automatically acting upon a piece of continuous rod or wire, cutting the same into short lengths of any desired shape for the manufacture of screws or other similar small articles.

The lathe is provided with a hollow spindle, through which the rod or wire to be cut extends, and by which it is rotated and subjected to the action of cutting-tools carried by a revolving turret, or by a suitable tool-carriage on the bed, the said tools being brought successively into operation upon the rod or wire until the latter is cut to the desired shape, when the portion that has been acted upon by the tools is entirely severed from the remainder of the rod or wire, and the latter fed forward to present another portion to be cut or shaped.

The spindle is provided with a chuck, which holds the rod or wire while the cutting-operations are taking place, and intermediate or connecting mechanism is provided between the various parts of the lathe by which the different operations upon the rod or wire are performed, the lathe being shown in this instance as acting on a square rod, cutting the same to form blanks for set-screws; and the various operations are performed in substantially the following order, beginning at the point when the wire has been fed forward in position to be operated upon:

The chuck, which was open while the rod was being fed, is first closed to grip the rod, after which laterally-moving cutters are caused to act upon the projecting portion of the rod near the chuck to produce grooves around the same, leaving a square portion between the said grooves for the head of the screw. While this operation is taking place the turret opposite the end of the rod is moved backward and forward lengthwise of the lathe, to bring different cutting-tools into operation upon the revolving rod, the turret being rotated to present a new tool when the turret is retracted or moved back.

As shown in this instance, the turret has two tools, one for cutting the sides of the shank portion of the screw, the other for cutting the end of the screw; and it also has a stop or abutment which is brought into position just before the feed of the rod takes place, in order to engage the end of the rod and limit the amount of the feeding movement.

The invention consists in various details of construction and combinations of elements by which the different operations are performed at the proper time with relation to one another.

Figure 1 is a front elevation of a lathe embodying this invention; Fig. 2, a rear elevation of a portion thereof; Fig. 3, a plan view thereof; Fig. 4, a partial longitudinal section on a larger scale; Figs. 5 and 6, transverse sections on a larger scale; Figs. 7, 8, 9, 10, 11, 12, 13, and 14, details of the turret mechanism, to be referred to. Figs. 15 and 16, details of the actuating-cams for moving the turret longitudinally; Figs. 17, 18, 19, and 20, details of the rod-feeding mechanism; Fig. 21, a detail of the chuck-operating mechanism; Figs. 22, 23, and 24, details of the chuck; Fig. 25, a detail of a portion of the actuating mechanism for the laterally-moving tool-carriage; Figs. 26, 27, 28, 29, details of various tools which may be used in the turret of the lathe; Fig. 30, a side elevation, partly in section, for a set-screw blank produced in the lathe when operating as shown in the main figures; Fig. 31, a detail of the actuating-cam for the laterally-moving tool-carriage.

The lathe is actuated by a cone-pulley, $a$, turning in suitable bearings, $a'$, and provided with a gear, $a^2$, meshing with and actuating the gear $b$ on the main spindle $b'$, turning in bearings $b^2$, and made hollow or tubular to permit the rod or wire $b^3$ that is to be acted upon to pass longitudinally through it. The said spindle is provided at its end with a chuck, $c$, provided with jaws $c'$, (see Figs. 22 and 23,) having a radial movement in the chuck to cause them to close on the rod $b^3$ and hold the same, or to open or separate to release the rod while the longitudinal feed of the rod takes place. The said jaws slide in a groove in the body of the chuck, being retained in the said groove by keys $c^2$, and the said jaws are threaded to engage screws $c^3$, having pinions $c^4$ (see Fig. 24) engaged by toothed arms $c^5$, connected with a grooved collar, $c^6$, having a longitudinal movement on the spindle for the purpose of rotating the pinions $c^4$ and screws $c^3$, and thus opening or closing the jaws of the chuck. Heretofore a chuck has had its jaws operated by screws having toothed heads actuated by a sliding collar on the chuck.

The screws $c^3$ are prevented from longitudinal movement by blocks $c^7$, embracing an annular groove in each screw, as shown in Figs. 22 and 24. The collar $c^6$ is thus moved at the proper times by the following devices, constituting the chuck-operating mechanism:

The spindle $b'$ is provided with a worm, $d$, meshing with the worm-gear $d'$ (see Fig. 1) on a shaft, $d^2$, having a clutch member, $d^3$, loose upon it, and a clutch member, $d^4$, (see Fig. 3,) splined to rotate with the said shaft, but capable of being moved longitudinally thereon into and out from engagement with the clutch member $d^3$, which is thus caused to rotate with the shaft $d^2$ only when the clutch members are engaged.

The clutch member $d^4$ is operated by a shipper, $d^5$, actuated intermittingly by a cam, $d^6$, on a gear, $d^7$, actuated by an intermediate train of gearing, $d^8$, from a gear, $d^9$, on the shaft $d^2$, the said clutch thus being thrown into operation during a short period of the rotation of the spindle. When the clutch $d^3$ $d^4$ is thus thrown into engagement, the clutch member $d^3$ rotates with the shaft $d^2$. The said clutch member is provided with teeth or shoulders $e$, (see Fig. 21,) which alternately engage shoulders $e'$ and $e^2$ on a slide-bar, $e^3$, provided with a fork, $e^4$, having pins or projections entering the groove of the collar $c^6$, thus causing the said collar to move to and fro, and thus open and then close the jaws of the chuck during the partial rotation of the clutch member $d^3$, between which movements of the clutch-jaws the feed of the rod $b^3$ takes place.

A spring-finger, $e^5$, on the slide-bar $e^3$ engages one of the shoulders of the clutch-member $d^3$ when the latter is disengaged from the other member, thus preventing it from turning frictionally with the shaft $d^2$, and retaining it in the proper position with relation to shoulders of the slide-bar when the engagement of the clutch takes place.

When the chuck-jaws are operated by the forward movement of the slide-bar $d^3$, as just described, the feed of the rod $b^3$ is effected by the following devices, constituting the rod-feeding mechanism, and best shown in Figs. 17, 18, 19, 20: The end of the rod $b^3$ enters a mandrel, $f$, turning in a bearing, $f'$, sliding on a guide-rod, $f^2$, extending parallel with the axis of the spindle a distance equal to the length of the rod that is to be acted upon, the said mandrel containing a follower, $f^3$, turning in a bearing, $f^4$, also mounted to slide longitudinally on the guide-rod $f^2$, and connected with the feed-chain $f^5$, passing over a supporting-pulley, $f^6$, near the end of the guide-rod $f^2$, and an actuating-pulley, $f^7$, (see Fig. 1,) near the end of the lathe-spindle.

The actuating-pulley $f^7$ is fast on a shaft $f^8$, provided with a ratchet, $f^9$, (see Fig. 21,) and a pawl-carrier, $f^{10}$, loose on the said shaft and having a toothed segment, $f^{11}$, meshing with a toothed segment, $f^{12}$, on an arm or lever, $f^{13}$, pivoted at $f^{14}$ upon the frame-work of the lathe, and having connected with its free end a weight, $f^{15}$, the said arm $f^{13}$ being actuated by a pin or stud, $f^{16}$, (shown in dotted lines, Fig. 1,) which raises the said arm, turning the pawl back over the ratchet $f^7$, so that when the pin $f^{16}$ in the further rotation of the gear $d^7$ is removed from beneath the arm $f^{13}$ the weight $f^{15}$ (see Fig. 1) is applied through the ratchet and pawl to the shaft $f^8$, with a tendency to rotate the same in a direction to move the chain $f^5$, and bearing $f^4$ connected therewith, with the follower $f^3$ and rod $b^3$, toward the spindle $b'$, so that as soon as the chuck-jaws are opened the said weight will fall and feed the rod $b^3$.

The weight $f^{15}$ is prevented from exerting pressure on the rod (except when the chuck-jaws are opened) by a holding device consisting of a disk, $g$, (see Fig. 3,) on the shaft $f^8$, having its periphery in position to be engaged by the short arm $g'$, of a locking-lever pivoted at $g^2$, and having its long arm $g^3$, (shown in dotted lines, Fig. 2,) acted upon by a lever, $g^4$, (see Fig. 2,) operated by a stud, $g^5$, on the slide-bar $e^3$, by which the chuck-jaws are operated, the said stud pressing against the curved arm of the lever $g^4$ and causing the latter to press the arm $g'$ of the locking-lever against the periphery of the disk $g$, preventing the said disk and the pulley $f^7$ and the shaft $f^8$ thereof from turning while the chuck-jaws are closed, until, in the movement of the slide, by which the chuck-jaws are opened, the stud $g^5$ is disengaged from the lever $g^4$, and the pressure of the lever $g' g^3$ on the disk $g$ is relieved, so that the weight $f^{15}$, which has been previously raised, is permitted to fall, turning the pulley $f^7$, and thus causing the feed of the rod to take place.

Thus the entire operation of opening the chuck-jaws, feeding the rod, and closing the chuck-jaws takes place while the cam projection $d^6$ is passing by and acting on the end of the clutch-shipper $d^5$, after which the said clutch-shipper is withdrawn by a spring, $d^{10}$, and the chuck-jaws remain closed and the feed-shaft $f^8$ locked by the lever $g'$ during the subsequent rotation of the gear $d^7$, while the operations are being performed on the end of the rod $b^3$, projecting beyond the chuck, and the weight $f^{15}$ is being raised to prepare for the next feeding movement, when the cam-projection $d^6$ again arrives at the end of the shipper $d^5$.

The feed movement of the rod $b^3$ is limited by a stop or abutment, $h$, connected with a revolving turret or tool-holder, $h'$, turning around a vertical axis or pivot, $h^2$, (see Fig. 5,) on a carriage, $h^3$, having a longitudinal movement on the bed of the lathe toward and from the chuck, and being held stationary while the feed of the rod takes place.

The mandrel $f$ (see Fig. 18) is provided with a yielding catch, $f^{20}$, which engages the bearing $f'$ and causes the latter to accompany it along the guide-rod $f^2$ in the feeding movement until the said bearing $f'$ arrives at the end of the said guide-rod $f^2$, when it is arrested and the catch $f^{20}$ yields, permitting the mandrel to continue its sliding movement through the bearing $f'$ into the hollow spindle.

The plunger $f^3$ is provided with an engaging-finger, $f^{21}$, which engages the end of the mandrel $f$, as shown in Figs. 17 and 20, pushing the latter along as the feed takes place, and the said finger is provided with a projection, $f^{22}$, which, upon arriving at the bearing $f'$ after the latter has been arrested, and the plunger, with the follower, has been fed into the interior of the spindle, is disengaged by the said bearing from the said mandrel, permitting the plunger to move forward through the mandrel and the tongue $f^{23}$, (see Fig. 17,) at the end of the said plunger, to push the end of the rod into the chuck-jaws.

After the rod has been fed forward and gripped by the jaws of the chuck, as described, it is, as shown in this instance, acted upon by laterally-moving tools $i$ $i'$, (see Fig. 6,) the former being a cutting-off tool and the latter a pair of grooving-tools for producing grooves in the square rod, between which the head is formed, one of said grooves being shown at 20 in Fig. 30, and the remains of the other at 21, same figure, this other groove, 21, serving to round off or chamfer the crown of the head when the bolt is cut off. The said tools are fastened upon the tool-posts $i^2$ on a carriage, $i^3$, movable on a transverse way, $i^4$, Fig. 1, on the lathe bed A, the said carriage being actuated by the following mechanism:

A cam, $i^5$, (see Fig. 31,) on the shaft $d^{20}$, actuated by the train of gearing $d^8$, (see Fig. 1,) as previously described, which shaft makes one complete rotation for the formation of each blank from the rod $b^3$, has a groove which receives a roller, $i^6$, on a slide-bar, $i^7$, moving lengthwise of the lathe-bed A in suitable guides at the rear thereof. The said slide-bar $i^7$ is adjustably connected with the threaded stem of a slide-bar, $i^8$, which is thus caused to move longitudinally in a bracket, $i^9$, (see Fig. 6,) at the rear of the lathe-bed. The said slide-bar $i^8$ is connected with a disk, $i^{10}$, (shown in plan view in Fig. 25,) having a diametrical groove, $i^{12}$, and an annular groove, $i^{13}$, around its periphery, engaged by clamping-pieces $i^{14}$, by which it is fastened upon the slide-bar $i^8$, with the groove $i^{12}$ at any desired angle, to enable the said groove to be inclined to the line of movement of the slide-bar $i^8$, as shown in Fig. 25. The said groove $i^{12}$ receives a stud, $i^{15}$, shown as provided with an anti-friction-roller, and connected with the tool-carriage $i^3$, so that as the said slide-bar $i^8$ is moved longitudinally by the cam $i^5$, the sides of the groove $i^{12}$, acting on the stud $i^{15}$, will cause the tool-carriage $i^3$ to move laterally across the lathe-bed, the proportion of the said lateral movement relative to the longitudinal movement of the slide-bar $i^8$ depending upon the angle of the groove $i^{12}$, and being varied and adjusted by turning the disk $i^{10}$.

The shape of the groove in the actuating-cam $i^5$ for the tool-carriage $i^3$, is such that in the movement of the cam just after the cam $d^6$ has operated to permit the chuck-jaws to close the said tool-carriage $i^3$ will be moved to cause the cutting-tool $i$ to enter the rod $b^3$ for a short distance, after which the tool-carriage will be moved in the opposite direction, causing the tools $i'$ to act upon the rod to the depth indicated by the groove 20, Fig. 30, after which the carriage will be moved in the opposite direction sufficiently to cause the cutting-tool $i$ to wholly sever the rod $b^3$, after which the carriage is again moved back to the intermediate position shown in Fig. 3, in which both tools $i$ $i'$ are removed from the rod, so as not to interfere with its feeding movement, which takes place while the carriage is in this intermediate position.

The way $i^4$, upon which the carriage $i^3$ slides, may be moved lengthwise of the lathe-bed on guides $i^{20}$, (see Fig. 6,) and when set in a proper position may be fastened by a clamping device, $i^{21}$. While the laterally-moving cutters $i$ $i'$ are acting on the sides of the rod or wire, as just described, the said rod or wire is also operated upon from the end by tools $k$ $k'$ fastened in the revolving turret $h'$, the said turret being adapted to turn on its axis or pivot $h^2$, connected with the carriage $h^3$, (see Figs. 4 and 5,) adapted to slide longitudinally on a guide or way, A', on the bed A, the said carriage having connected with it an arm, $h^4$, extended down through a slot in the lathe-bed, as shown in Fig. 4, and connected with an actuated rod, $h^5$.

The arm $h^4$ is provided with a neck or stem, $h^{15}$, passing through a block, $h^6$, at the under side of the carriage $h^3$, the said block being threaded to constitute a nut for a threaded rod, $h^7$, (see Fig. 7,) passing through the said nut $h^6$, and adapted to turn without longitudinal movement in the said carriage, so that the latter may be adjusted with relation to the arm $h^4$ by turning the screw $h^7$ by its handle $h^8$.

The turret-carriage $h^3$, when a given tool has been placed by the rotary movement, as will be hereinafter described, is moved longitudinally into position to act upon the end of the rod $b^3$, by means of its actuating-rod $h^5$, which is forked, as shown in Fig 15, to embrace the shaft $d^{20}$, provided with a cam, $m$, having a short concentric portion, $m^3$, which engages a roller, $m'$, connected with the rod $h^5$, and holds the turret $h'$ stationary while the stop $h$ is presented in line with the rod $b^3$, as shown in Fig. 3, to limit the feeding movement of the rod. After the portion $m^3$ of the cam has passed by the said roller $m'$, the carriage is moved back a short distance by one of the cam-surfaces, $n$, connected with a cam-disk, $n'$, on the shaft $d^{20}$, (see Fig. 16,) and actuating a roller, $n^2$, on an arm, $n^3$, pivoted on the frame A at one end, and connected at the other end by a link, $n^4$, with an arm, $n^5$, from the fork on rod $h^5$, the said cams $n$ operating to move the turret away from the end of the rod held in the chuck. While the turret is thus retracted or moved back, it is partially rotated to present the tool $k$ in position to act on the end of the rod, the said tool being a hollow milling-tool, as shown in Fig. 29, after which the long eccentric portion $m^4$ of the cam $m$ operates to move the turret gradually toward the end of the rod $b^3$, the said milling-tool cutting off the square portions of the rod to produce a cylindrical shank, 22, (see Fig. 30,) and after the portion $m^4$ of the cam $m$ has moved the turret up so that the tool $k$ has acted on the entire length of the shank of the screw-blank the turret is again retracted by one of the surfaces $n$ of the retracting-cam, and while thus retracted is again rotated to bring the tool $k'$ in line with the end of the rod $b^3$, the said tool, as shown in Figs. 26, 27, being provided with an inclined cutting-edge, $k^2$, for tapering the end of the screw, and with a beveled point, $k^3$, to cut a tapering socket, 24, in the end of the said screw-blank. (See Fig. 30.) After the tool $k'$ has operated, the turret is again retracted and turned, and then again moved forward and held by the portion $m^3$ of the cam $m$, with the stop or abutment $h$ in line with the end of the rod.

The turret is provided with tools or devices to perform three distinct operations upon the rod, and there are two sets of the tools or devices $k\,k'$, as shown, arranged at equal distances around the said turret, which is turned through one-sixth of a revolution each time that it is retracted by the following turret-turning mechanism:

The cam-shaft $d^{20}$ is provided with a series of arms, $o$, having projections or anti-friction rollers $o'$, (see Fig. 2,) which enter the space between two cam-surfaces, $o^2$, connected with a slide-bar, $o^3$, itself connected with an arm, $o^4$, on a rock-shaft, $o^5$, at the side of the turret-carriage $h^3$, (see Figs. 2 and 11,) the projections $o'$ thus causing the bar $o^3$ to move back and forth as each of the said projections passes through the space between the cam-surfaces $o^2$, which takes place while the turret-carriage is retracted. The rock-shaft $o^5$ is connected with the toothed arm $p$, passing through a slot in an annular upright projection, $h^{30}$, from the turret-carriage $h^3$, and meshing with a toothed plate, $p'$, mounted to turn in either direction around the pivot $h^2$ of the turret $h'$, this portion being best shown in Figs. 5 and 11.

The plate $p'$ is provided with a pawl or dog, $p^2$, (shown in Figs. 11 and 13, the latter being a section on line $x^{13}$ of Fig. 11,) which, when the plate $p'$ is rotated by the oscillation of the arm $p$, moves back and engages one of the series of shoulders $p^4$ in the under side of the turret $h'$, the said shoulders being spaced to correspond with the tools carried by the turret, so that when the arm $p$ and plate $p'$ make the return movement the turret $h'$ will be engaged by the pawl $p^2$ and turn with the plate $p'$. A pawl, $r$, connected with the ring $h^{30}$ of the carriage, (see Fig. 11,) engages a projection on the turret, preventing the latter from rotating in the reverse direction to that in which it is turned by the plate $p'$ and pawl $p^2$. The turret after being thus turned is locked positively and prevented from turning in either direction by a locking device, $t$, (see Figs. 10 and 11,) consisting of a bolt having a vertical movement in the ring $h^{30}$, and having its end adapted to enter one of a series of holes or recesses, $t'$, (see Figs. 5 and 12,) in the portion of the turret bearing on the said ring. The said bolt or locking device is withdrawn from the hole $t'$ when the plate $p$ is moved to turn the turret by means of a releasing cam or projection, $t^{10}$, (see Figs. 5, 9, 11,) the inclined end $t^2$ (see Fig. 9) of the said releasing-cam engaging a stud or roller, $t^3$, (see Figs. 10 and 11,) connected with the bolt $t$, and thus depressing the said bolt at the time when the pawl $p^2$ engages the turret and begins to move it, the said bolt being, however, released before the end of such movement, so as to enter the hole $t'$ as soon as the latter comes in line with the said bolt, which is then thrown up by the spring $t^6$. (See Fig. 10.)

The stop $y$ (see Figs. 11 and 14, the latter being a section on line $x^{14}$ of Fig. 11) serves to positively arrest the turret in its rotary movement by engaging the side of one of the projections $r'$ at the end of the rotary movement of the turret. The said stop $y$ is disengaged from the shoulder $r'$ in order to permit the latter to move by a cam, $y'$, (see Figs. 8 and 11,) which, when the plate $p'$ is rotated, engages a projection, $y^3$, from the said stop $y$, depressing the same so as to disengage the projections $r$ of the turret.

It is obvious that the turret and tool-carriage $i^3$ may be provided with other tools to perform other operations on a rod of any usual shape, according to the article that it is desired to produce.

I claim—

1. In a turret-lathe, the combination of the hollow spindle, with wire-feeding mechanism consisting of a rotary movable mandrel, bearings therefor, a guide-rod upon which the bearings are free to slide, and actuating mechanism for moving the said parts on the said guide-rod, substantially as described.

2. The hollow spindle, chuck, and chuck-actuating slide-bar, combined with the rod-feeding devices and actuator therefor, and the locking device for said actuator, operated by the said slide-bar that actuates the chuck, substantially as described.

3. The combination, with the hollow spindle, of the mandrel for the rod or wire, adapted to pass into the said spindle-bearing for said mandrel, and the guide upon which said bearing may slide, combined with a catch, whereby the bearing is caused to accompany the mandrel along the guide until positively arrested at the end thereof, after which the bearing is disengaged by the catch and the mandrel permitted to move forward through said bearing and into the hollow spindle, substantially as described.

4. The hollow spindle and mandrel supporting one end of the rod or wire to be fed, and adapted to enter the said spindle, combined with the follower movable in said mandrel, and finger co-operating with the said follower and mandrel, substantially as described.

5. The combination, with devices supporting one end of the rod or wire to be operated upon, having a sliding movement by which the said rod is fed forward, of a feed-chain and actuator therefor, and ratchet-and-pawl connection between said feed-chain and actuator, and means, actuated by the mechanism of the lathe, whereby sufficient force is stored in the actuator between the successive feeding movements for a single feeding movement, substantially as described.

6. The chuck and its sliding jaws, combined with screws engaging said jaws, and provided with pinions, toothed arms engaging said pinions, a sliding collar connected with said arms, and slide-bar and clutch for actuating the said collar, substantially as described.

7. The rotating spindle, and worm thereon, and chuck connected with the said spindle, combined with the worm-gear, its shaft, and shouldered clutch-member loose thereon, and the clutch-member splined on said shaft, and shipper and controlling-arm therefor, and the slide-bar provided with shoulders co-operating with those of the loose clutch-member, the said bar being operatively connected with the chuck, substantially as described.

8. The combination, with the hollow rotating spindle adapted to have a rod or wire fed longitudinally therethrough, of the feed-chain, its actuating pulley, and ratchet connected with the arbor thereof, and the pawl-carrier and actuating-arm therefor, and mechanism for moving the said arm between the feeding movements back into position for the next feeding movement, substantially as described.

9. The combination of the hollow rotating spindle and chuck and chuck-operating mechanism, with the feed-chain for the rod or wire, its actuating pulley and locking-disk connected with the arbor thereof, and the locking-lever co-operating with said disk and actuated by the chuck-operating mechanism, substantially as described.

10. The rotating spindle and chuck thereon, and sliding collar operatively connected with the said chuck, combined with the shouldered slide-bar connected with the said collar, the continuously-rotating clutch-member, and the loose clutch-member adapted to be engaged and rotated thereby, provided with shoulders co-operating with those of the slide-bar, and the yielding holding device for said loose clutch-member, whereby the latter is held in proper position previous to its engagement with the continuously-rotating member, substantially as described.

11. The rotating spindle and revolving tool-carrying turret, combined with a toothed segment and toothed plate oscillated thereby around the axis of the turret, the pawl on the said plate for turning the turret in the movement of the plate in one direction, and the stop and locking device for the said turret and disengaging device therefor operated by the said toothed plate in its movement in the other direction, substantially as described.

In testimony whereof I have signed my name to this specification in the presence of two subscribing witnesses.

LUTHER M. NUTTING.

Witnesses:
CHARLES R. CORNING,
RUFUS P. STANIELS.